June 14, 1955  A. S. McKAY  2,710,925
RADIOACTIVITY BORE HOLE LOGGING
Filed March 28, 1952
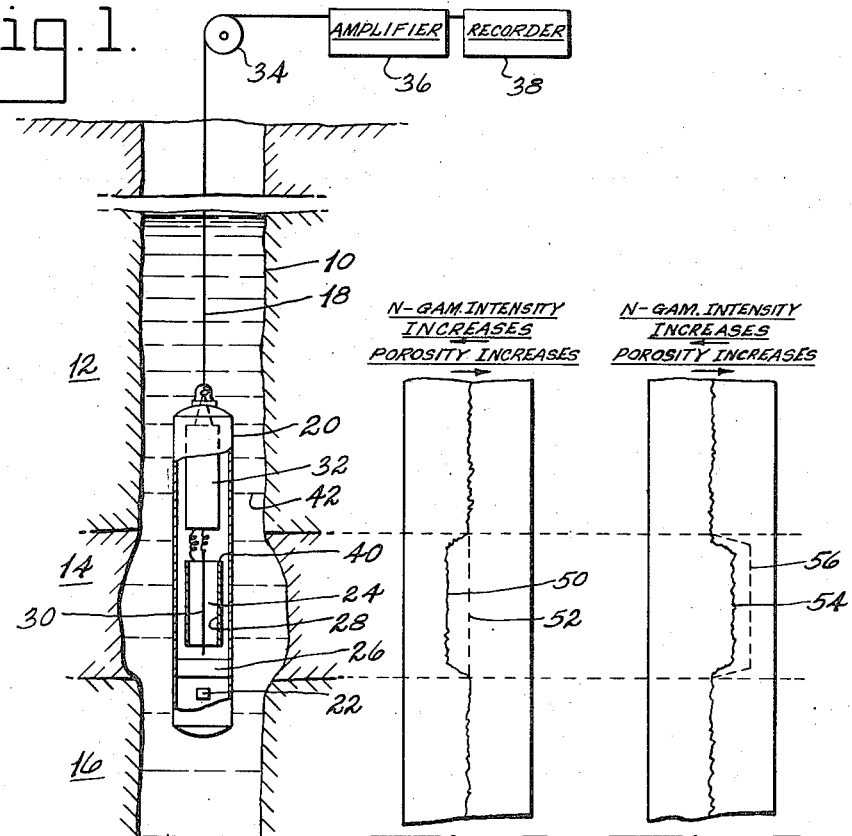
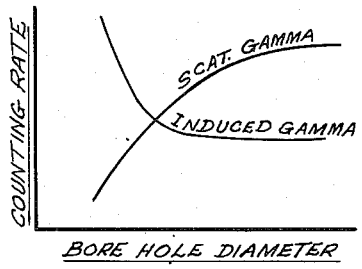
Fig.4.
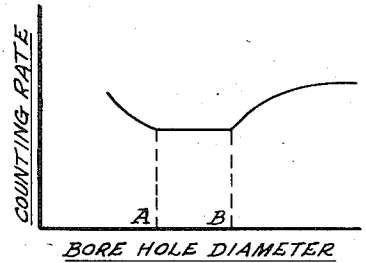
Fig.5.
INVENTOR.
ALEXANDER S. McKAY
BY
ATTORNEY United States Patent Office 2,710,925
Patented June 14, 1955

2,710,925

RADIOACTIVITY BORE HOLE LOGGING

Alexander S. McKay, Bellaire, Tex., assignor to The Texas Company, New York, N. Y., a corporation of Delaware Application March 28, 1952, Serial No. 279,021

2 Claims. (Cl. 250—83.6)

This invention relates to the study of earth formations and more particularly to the logging of subsurface formations traversed by a well or bore hole. The principal object of the invention is the provision of a method and an apparatus for making a radioactivity bore hole log of the induced gamma ray or neutron-gamma ray type which will not be influenced by or contain inaccuracies due to variations in the diameter of the bore hole.

It is now well recognized that when a source of neutrons is passed through a bore hole so that the neutrons pass outwardly from the source into the surrounding formations, a measurement of the gamma rays induced in the formations by the neutron bombardment provides information as to the porosities of the formations traversed. When a formation is sufficiently porous to contain water or oil in its pore spaces, more or less of the neutrons will be absorbed in this hydrogen containing formation and a detector of gamma rays passed through the hole in the vicinity of the source will respond to these varying intensities of induced gamma rays. A record or log of these intensities, when correlated with the depths of the measurements in the hole, will indicate the relative hydrogen contents and, thus, the porosities of the formations. It has recently been recognized that the conventional induced gamma ray log as described above does not always provide true indications of the porosities, this being due to the fact that the detector response will be affected by variations in the diameter of the hole throughout its length. Thus, if a portion of the formation walls are "washed out" so that the hole is larger in diameter at that point than it is at other depths, there will be a larger amount of drilling mud or well fluid such as oil or water surrounding the measuring instrument. Since this well fluid contains hydrogen, many of the neutrons will be absorbed therein and the resulting log, which would appear to indicate a zone of high porosity at that depth, will be in error.

In accordance with the invention, a neutron source which also emits gamma rays such, for example, as a mixture of radium and beryllium is used and some of these gamma rays originating in the source will be scattered in the surrounding material such as the well fluid and returned to the detector to supplement the gamma rays induced in the formations by neutron bombardment. The greater the diameter of the bore hole, the more of these scattered gamma rays will be returned to the detector and by controlling the size of the scattered gamma ray component of the intensities measured by the detector, the effect on the induced gamma ray log of the variations in hole diameter can be offset. The resulting log will therefore provide a true indication or measurement of the formation porosities.

In carrying out the invention, a shield is disposed around the detector, this shield being capable of absorbing scattered gamma rays which, as is well known, have a much lower energy than the gamma rays induced by neutron bombardment. By using a shield of this type having a proper thickness, an induced gamma ray log can be made which will be substantially insensitive to variations in the size of the bore hole within certain ranges of bore hole diameter.

For a better understanding of the invention, reference may be had to the accompanying drawing in which:

Figure 1 is a vertical elevation through a portion of a bore hole showing an induced gamma ray logging instrument suspended therein;

Figure 2 is a diagrammatic illustration of a section of a log taken through a zone of low porosity;

Figure 3 is a view similar to Figure 1 but made with the assumption that the formation or zone is of a high porosity;

Figure 4 is a curve showing detector counting rate as a function of bore hole diameter with two curves, one representing induced gamma rays and the other scattered gamma rays; and Figure 5 is a curve somewhat similar to Figure 4 but in which the curve is substantially a composite of the two curves of Figure 4.

Referring to the drawing, a bore hole 10 is shown as traversing several subsurface formations such as those indicated at 12, 14 and 16. It will be noted that the walls of the bore hole within the formation 14 have been washed out or enlarged, or in other words, that the diameter of the bore hole within the formation 14 is larger than in the formations 12 and 16. Shown suspended from a cable 18 is a logging instrument indicated generally by an elongated, sealed housing 20, this housing containing a source 22 of neutrons and gamma rays and a gamma ray detector 24 separated from the source by a shield 26 capable of absorbing those gamma rays originating in the source and which would otherwise pass upwardly directly to the detector. While the detector 24 can be of any suitable type capable of responding to gamma rays, it is shown as an instrument of the electric pulse producing or counter type having a cylindrical cathode 28 and a centrally disposed wire anode 30. The electrodes of the detector are connected to a suitable preamplifier 32, the output of which is connected to the lower end of the cable 18. At the surface the cable 18 passes over a suitable reel or drum 34 adapted to measure the amount of cable payed out and thus the depth of the logging instrument in the hole. The upper end of the cable passes to an amplifier 36 which is connected in turn to a suitable recorder 38, preferably of the type which provides a trace on a moving tape or film strip. Shown as surrounding the sides of the detector cathode 28 is a cylindrical shield member 40 of a material such as lead, tungsten or the like capable of absorbing some of the gamma rays originating in the source 22 and scattered within the material surrounding the logging instrument.

The logging instrument 20 may either be lowered or raised through the bore hole 10 and neutrons from the source 22 will pass outwardly into the surrounding material including the formations 12, 14 and 16 wherein, depending upon the hydrogen content and thus the porosity of the formations, more or less gamma rays will be induced, some of these induced gamma rays passing back into the hole to be intercepted by the detector 24. As is indicated above, gamma rays from the source 22 will also pass outwardly into the surrounding material including the bore hole fluid 42 and some of the gamma rays will be scattered therein and intercepted by the detector 24.

As is shown in Figure 4, the counting rate of the induced gamma ray component intercepted by the detector decreases as the bore hole becomes larger until a constant value is reached, after which the log is insensitive to possible changes in the hydrogen content or porosity of the surrounding formations. This is what would be expected since the increase in bore hole size means that there is more hydrogen around the neutron source and this is equivalent to an increase in the porosity of the formation. Thus, it is very desirable to be able to distinguish between those changes in the induced gamma ray log which are caused by changes in the nature of the formation and those which are caused by variations in bore hole diameter. Figure 4 also shows that the scattered gamma ray or density log is also very sensitive to changes in the hole diameter because of the difference between the density of the bore hole fluid which is usually drilling mud, and the density of the surrounding formation. In this case, the detector counting rate increases as the hole size increases until a constant value is reached after which the instrument is insensitive to any possible formation changes. Since the formation density changes are comparatively small, the scattered gamma ray log or curve is very largely a "caliper" log of the bore hole diameter. It will also be noted in Figure 4 that the induced gamma and the scattered gamma logs respond to the bore hole diameter in the opposite sense. Thus, by combining the proper proportion of the scattered gamma ray log with the induced gamma ray log, one can obtain the condition shown in Figure 5 where the counting rate is insensitive to changes in the bore hole diameter from A to B.

It is, therefore, possible to vary the size of the scattered gamma ray component by changing the amount of shielding about either the source or the detector. It has been found that with an average drilling mud density and a source containing, say 200 milligrams of radium, it is possible to provide a logging instrument which is insensitive to bore hole size in the region between 8¾ inches and 10 inches bore hole diameter by providing the lead shield 40 with a thickness of about ¼ inch. Most of a hole drilled with an 8¾ inch bit will lie within these limits. Of course, a given shield thickness will be suitable only for a certain range of hole sizes and average drilling mud density and the thickness of the shield should be greater or less, depending upon the drilling mud density and the range of bore hole sizes which it is expected to be encountered.

Figures 2 and 3 are provided to show the effect on an induced gamma ray log of a change in the bore hole diameter. In both figures, it is assumed that the induced gamma ray intensity increases toward the left and that porosity increases toward the right.

In Figure 2 let us assume that the formation 14 has a lower porosity than the formations 12 and 16. If, then, the walls of the bore hole were substantially straight, that is, if the diameter within the formation 14 is the same as that in the formations 12 and 16 and if there were no scattered gamma ray component at all, the log would indicate a decrease in porosity as evidenced by the portion 50 of the log. Again assuming that there is no scattered gamma ray component but that the hole has a greater diameter opposite the formations 14, as is actually the case in Figure 1, the log would be as is indicated by the dotted line 52 and would thus not indicate the true fact that the porosity of the formation 14 is lower than the upper and lower formations. Scattered gamma rays will, of course, be present and by providing the proper thickness of the shield 40, more scattered gamma rays would be intercepted by the detector due to the greater amount of fluid around the instrument and the log would again move to the left and follow the original heavy line 50 which is as would be desired, since the log will then indicate the fact that the porosity of the formation 14 is lower than that of the formations 12 and 16.

With reference to Figure 3, let us assume that the porosity of the formation 14 is higher than that of the formations 12 and 16. Again, assuming a straight hole and with no scattered gamma ray component, the log will be that represented by the solid line 54. However, due to the enlargement of the hole in the formation 14 and still assuming no scattered gamma ray component, there will be more hydrogen containing material around the instrument and the log will move still farther to the right as is indicated by the dotted line 56. This would, therefore, indicate too high a porosity for the formation 14. As has been set forth with reference to Figure 2, with the proper thickness of the shield 40 the scattered gamma ray component of the log can be controlled so that the additional scattered gamma rays intercepted by the detector will cause the log to indicate a higher intensity and the log will again move to the left, following the solid line 54. Thus, a true indication of the higher porosity of the formation 14 will be obtained.

If the cathode 28 of the detector 24 is formed of a high atomic number metal such, for example, as lead or tantalum rather than a low atomic number metal such as brass, the detector will be preferentially more sensitive to the low energy scattered gammas than to the comparatively high energy induced gammas. Therefore, if desired a detector cathode of a high atomic number metal can be used to increase the scattered gamma ray component in conjunction with a thinner shield 40.

Obviously, many other modifications and variations of the invention as hereinbefore set forth may be made without departing from the spirit and scope thereof, and therefore, only such limitations should be imposed as are indicated in the appended claims.

I claim:

1. The method of making an improved induced gamma ray log of the earth formations traversed by a bore hole to determine the porosities of said formations which comprises passing through said hole a radiation source from which neutrons and gamma rays pass outwardly into the earth formations and other material generally surrounding said source, measuring in the vicinity of said source gamma rays induced in said formations by neutron bombardment, while simultaneously including in said measurement along with said induced gamma rays a quantity of the gamma rays originating in the source and scattered in the material between said detecting means and the walls of the bore hole, this scattered gamma ray component varying inversely with the induced gamma ray component of the measured radiation and serving to neutralize inaccuracies in the measurements caused by variations in the diameter of the bore hole.

2. The method of making an improved porosity log of the earth formations traversed by a bore hole which comprises passing through said hole a source of neutrons and gamma rays, measuring in the vicinity of said source the intensity of gamma rays induced in said formations and in the liquid between the source and the walls of the hole, by neutron bombardment, and eliminating from said measurements the effect of variations in the diameter of the bore hole by including in said measurement of induced gamma rays a quantity of the gamma rays originating in the source and scattered in the material between said detecting means and the walls of the bore hole, this scattered gamma ray component varying inversely with the induced gamma ray component of the measured radiation and serving to neutralize inaccuracies in the measurements caused by variations in the diameter of the bore hole.

References Cited in the file of this patent

UNITED STATES PATENTS

| | | |
|---|---|---|
| 2,275,456 | Neufeld | Mar. 10, 1942 |
| 2,349,753 | Pontecorvo | May 23, 1944 |
| 2,512,020 | Herzog | June 20, 1950 |